W. KARLSSON.
WATER HEATER.
APPLICATION FILED AUG. 18, 1921.

1,407,282.

Patented Feb. 21, 1922.
2 SHEETS—SHEET 1.

Inventor
Walfrid Karlsson
By
B. Singer, Atty

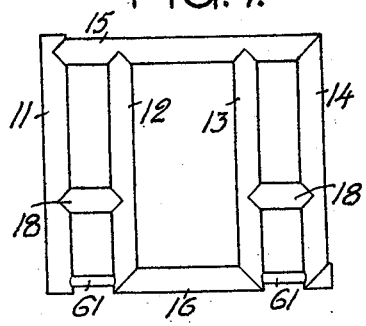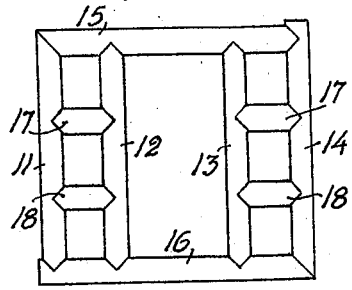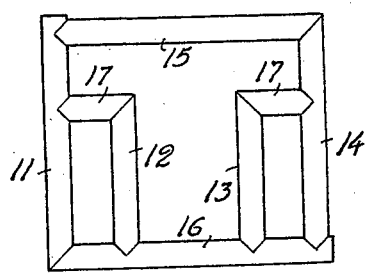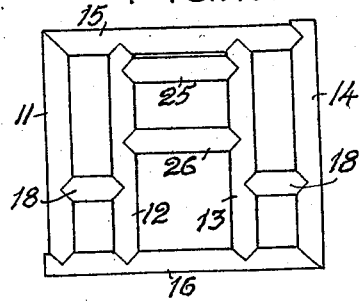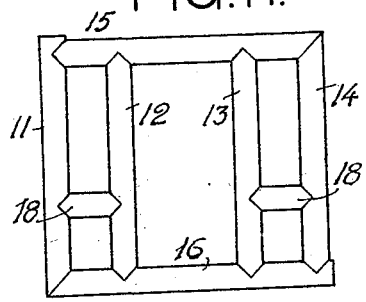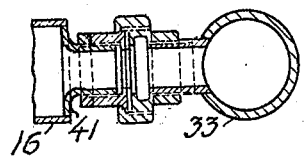

UNITED STATES PATENT OFFICE.

WALFRID KARLSSON, OF VIGGBYHOLM, SWEDEN, ASSIGNOR TO AKTIEBOLAGET TUBUS, OF STOCKHOLM, SWEDEN, AN ORGANIZATION OF SWEDEN.

WATER HEATER.

1,407,282.  Specification of Letters Patent.  Patented Feb. 21, 1922.

Application filed August 18, 1921. Serial No. 493,495.

*To all whom it may concern:*

Be it known that I, WALFRID KARLSSON, a subject of the King of Sweden, residing at Viggbyholm, Sweden, have invented a Water Heater, of which the following is a specification.

My invention relates to improvements in heaters for central systems of heating and for other purposes of the kind described in my previous application No. 383,026, where the heater consists of a series of upright transverse members assembled in contact with each other and communicating with longitudinal feeding and discharging tubes which are connected to the pipe system to be heated, each member consisting of upright and horizontal communicating pipes so disposed that between them is formed a furnace in the centre and a set of longitudinal flues on both sides of the furnace, the flues in each set (preferably four in number) communicating with each other alternately before and behind so as to form a continuous zigzag-flue, one end of which communicates with the furnace and the other end with the chimney, direct or indirect.

In my present improvement the lowest flue of each set is arranged beneath the heater instead of within the same, and said lowest flues may be extended transversely toward each other so as to flow together and form a single broad flue instead of two flues. As the gases, when passing this broad flue give off their heat to the entire or nearly entire lower surface of the heater, the effect of this heater will be about the same as that of the heater described in the previous application though the number of pipes in the members is smaller and the cost of manufacture cheaper, as the number of joints to be welded is less.

In the accompanying drawings, which show some examples,

Fig. 7 front view of the second member (or rear view of the third member).

Fig. 8 view of an intermediate member and

Fig. 9 view of one of the rear members ($l$ or $m$).

Figure 1:
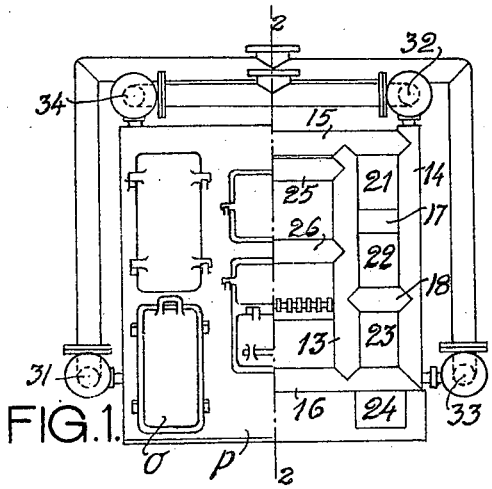
Fig. 1 is front view of the heater.

Fig. 10 is front view of the front member of the heater shown in Fig. 1.

Fig. 11 is front view of the second member.

Fig. 12 is section of one of the couplings.

Figure 3:
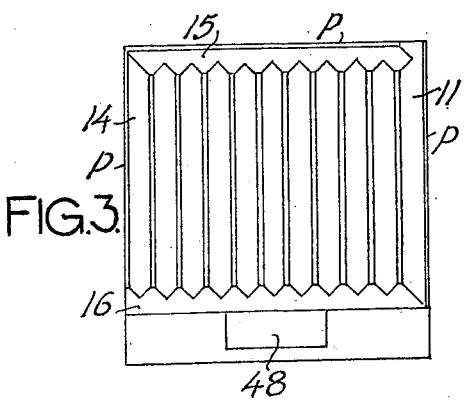
Fig. 3 shows the rear side.
Figure 4:
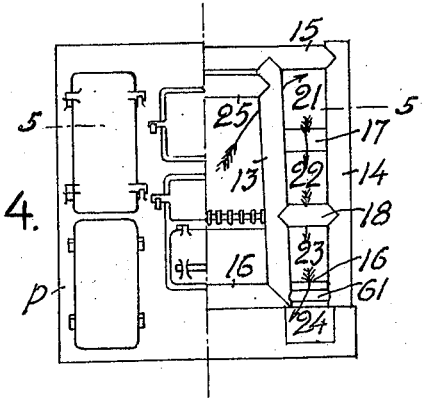
Fig. 4 is front view of a second example.
Figure 5:
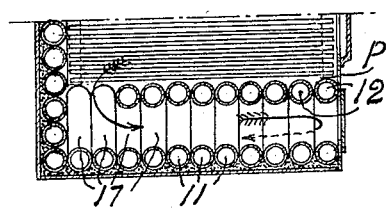
Fig. 5 is one half of a horizontal section of the same on line 5—5 of Fig. 4.

In all figures except Fig. 5 the insulation and sheet cover are omitted. In Figs. 1 and 4 the right half of the front plate $p$ is omitted. In Figs. 3, 4 and 5 the couplings and the assembling tubes are omitted.

Figure 2:
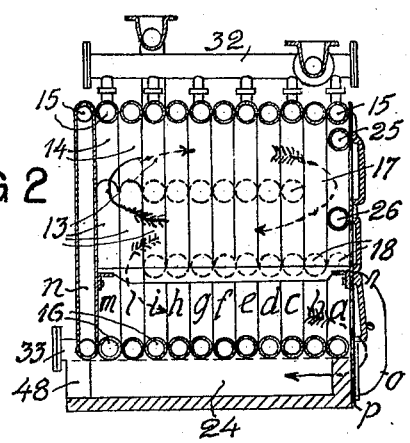
Fig. 2 is a vertical longitudinal section on the line 2—2 of Fig. 1.

In Fig. 2 the heater has twelve members marked $a\ b\ c\ d\ e\ f\ g\ h\ i\ l\ m\ n$. The number may vary. The intermediate members (say $c$–$i$) consist each of four upright pipes 11 12 13 14 and two horizontal pipes 15 16, one at the top and one at the bottom, both of the transverse length of the heater or member, and four short horizontal pipes, viz. two upper ones marked 17 and two lower ones marked 18 which connect the two extreme upright pipes 11 14 with the intermediate upright pipes 12 13. One or more of the front members differ from the intermediate members in having no upper short horizontal pipes 17. The first front member $a$ may have one or more intermediate horizontal pipes 25 26 which connect the intermediate upright pipes and should be so disposed that they do not obstruct the openings in the front plate $p$. One or more of the rear members (say $l$ and $m$) differ from the intermediate members in having no lower short horizontal pipes and in having the intermediate upright pipes shortened so as to not reach above the short horizontal pipes 17. The rearmost member $n$ differs from all other members in having the whole space between the pipes 11 14 15 16 filled with pipes (upright or horizontal), arranged so close as the possibility of welding will admit, so that this member can serve as rear wall of the heater. The front wall consists of a plate $p$ fastened to the front member $a$.

The members are filled with water. Each member has an inlet below for the water and an outlet above for the hot water or steam. The odd members are coupled to a common longitudinal feeding tube 31 and the outlets to a common longitudinal discharge tube 32. The other members are coupled to a common feeding tube 33 and a common discharge tube 34. When so coupled the members are in close contact with each other, so that all pipes 11 form a close wall and all pipes 14 another close wall. The pipes 12 and 13 form two intermediate walls or partitions which serve as side walls of the furnace. The short horizontal pipes 17 and 18 divide the spaces between the outer and intermediate wall into six longitudinal flues, three on each side of the furnace. The rear end of the upper flue 21 of each side communicates with the rear upper end of the furnace through the openings formed in the intermediate walls by shortening the intermediate upright pipes 12 13 in the two members *l m*. The front end of said flue 21 communicates with the front end of the next flue (22), and the rear end of this flue 22 communicates with the rear end of the next flue (23).

The front end of each of the two flues 23 communicates with a flue 24 beneath the heater. An upper side or roof of these flues 24 serves the underside of the heater. The other sides of said flues may consist of plates or brickwork or the like. The two flues 24 are preferably extended sidewise so as to flow together and form a common flue, the rear wall of which has an opening 48 for direct or indirect communication with the chimney.

The front plate *p* has openings in front of the flues 23 and 24. In the form shown in Figs. 1 and 2 these openings are covered by cup-shaped or trough-like doors *o*, which serve as communications between the front ends of said flues.

In the form shown in Fig. 4 one or more of the front members (say three) are modified so as to form communications between the front ends of flues 23 24 without using cup-shaped doors. For this purpose the portions 61 of the lowest horizontal pipe 16 which connect the upright pipes 11 12 and 13 14 are smaller in diameter than the rest of said pipe 16 so that between the members having such narrower pipe portions 61 are formed openings between said portions which openings serve as communications between flues 23 24. The front plate *p* has openings before the flues 23 24 even in this instance but the doors covering said openings may be flat or nearly so, the openings being intended only or chiefly to give access to the flues when these should be cleaned from ash and soot. Similar openings in front of the flues 21 22 serve the same purpose. Through one or more openings in the central portion of plate *p* the fuel is fed and the fire watched and poked and the ash removed.

The hot burnt gases leave the furnace at the rear upper corners and enter the rear end of the two upper flues 21, pass forward to the front end of these flues, then downward to the second flues 22, then backward to the rear end of said flues 22, then downward to the third flues 23, then forward to the front end of said flues, then downward to the flue or flues 24 beneath the heater, then backward through said flue 24 and out through its rear opening 48.

The intermediate upright pipes 12 13 may be either exactly vertical as shown in Fig. 1 or diverge downwards as shown in Fig. 4, so as to prevent the fuel from sticking between them.

The couplings which connect the members with the assembling tubes 31 32 33 34 may be as shown and described in the former application. Fig. 12 shows a variation, where one end of the coupling pipe 41 is flaring or conical so as to fit the end of pipe 16 (or 11 or 14) without any supplementary ring or the like.

It should be noted that the forms shown and described are examples only as several details may vary within the scope of the invention.

Figure 6:
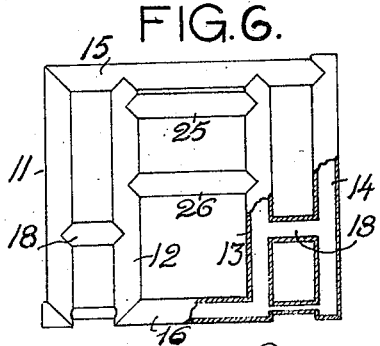
Fig. 6 is front view of the front member, partly section.

The members Figs. 6 and 7 belong to a heater which differs from Fig. 4 only in having all upright pipes parallel.

I claim:

1. A heater with a series of upright transverse members connected with longitudinal assembling tubes, the members being composed of pipes between which a furnace and several longitudinal flues are formed, characterized by that the intermediate members are composed of four upright pipes and two horizontal pipes of the transverse length of the members which connect the upper and lower ends of the upright pipes, and four short horizontal pipes (17 18) which connect the upright pipes in pairs; and that one or more front members consist of four upright pipes and two long horizontal pipes (15 16) and two short horizontal pipes (18), while one or more of the rear members consist of two upright pipes of the height of the members and two shorter upright pipes (12 13) and two horizontal pipes of the transverse length of the members which connect the upper and lower ends of the longer upright pipes, and two short horizontal pipes which connect the longer upright pipes (11 14) with the upper ends of the shorter upright pipes.

2. A heater as stated in claim 1 and having in the frontmost member (*a*) one or more additional short horizontal pipes which connect the intermediate upright pipes (12 13).

3. A heater as stated in claim 1 and having the rearmost member (*n*) composed of two upright pipes (11 14) and two horizontal pipes (15 16), one at the top and the other at the bottom, and a set of intermediate pipes which fill the opening between said four pipes as close as the possibility of welding admits, so that said member can serve as rear wall of the heater.

4. A heater as stated in claim 1, characterized by that those portions (61) of the lowest horizontal pipe (16) which connect the extreme upright pipes (11 14) with the intermediate upright pipes (12 13) are smaller in diameter in one or more of the front members than the rest of said pipe (16) and the other pipes, so that openings are formed between the assembled members at those portions (61) which openings serve as communications between the front end of the third flue (23) and a fourth flue (24) provided beneath the heater.

WALFRID KARLSSON.